May 19, 1936.  N. S. HILLYARD  2,041,178
STOP SIGNAL
Filed May 15, 1933  2 Sheets-Sheet 1
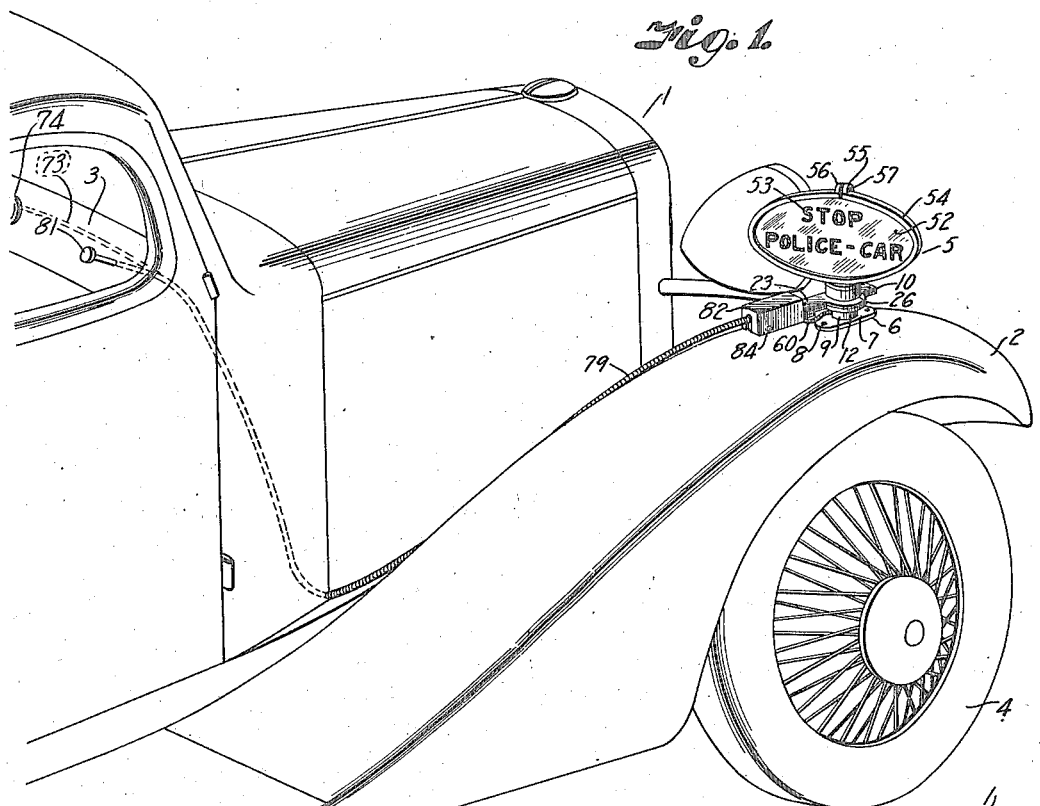
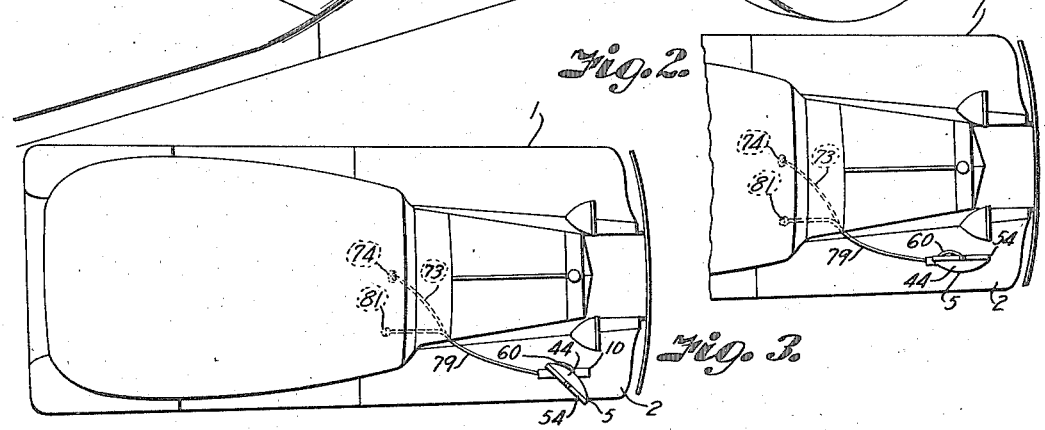
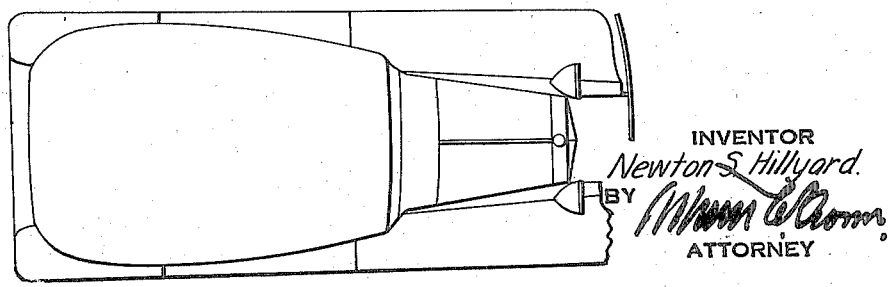
INVENTOR
Newton S. Hillyard.
BY
ATTORNEY

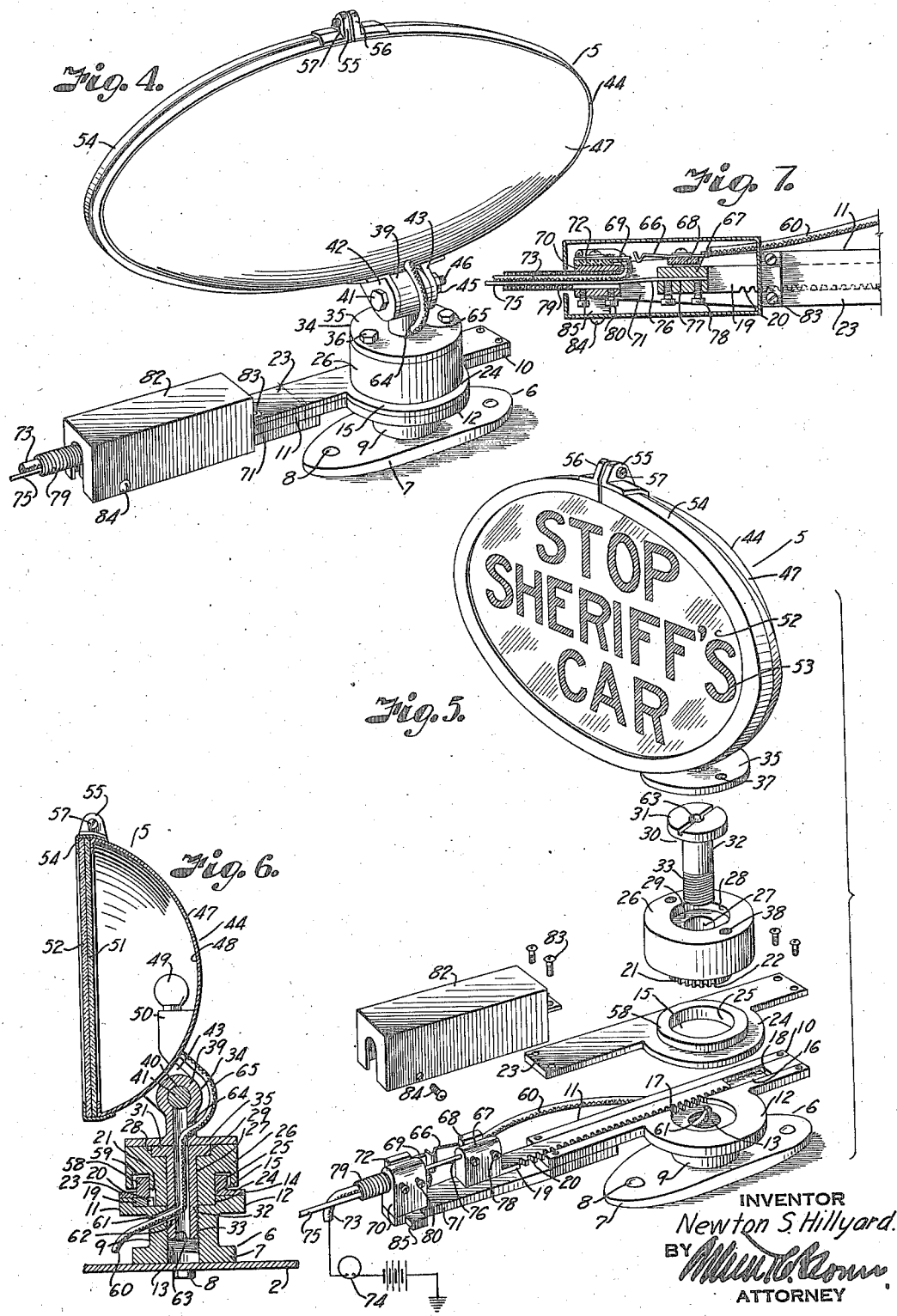

Patented May 19, 1936

2,041,178

UNITED STATES PATENT OFFICE 2,041,178

STOP SIGNAL

Newton S. Hillyard, St. Joseph, Mo.

Application May 15, 1933, Serial No. 671,116

3 Claims. (Cl. 116—46)

My invention relates to stop signals and more particularly to a signal lamp for peace officers' and road patrol cars to warn the driver of a vehicle to stop his car.

At the present time, it is difficult for patrols to halt moving vehicular traffic without exposing themselves to gun fire from the vehicle that they desire to stop, for the reason that it is necessary to overtake and run ahead of the vehicle before the driver can be made aware of the fact that he is wanted by the police.

On the other hand, if the peace officers stay to the rear of the car and sound the warning signal, it is possible that the driver may not be aware of the fact and thereby innocently subject himself to gun fire from the police.

It is, therefore, the principal object of the present invention to provide the peace officers' car with a signal that may be moved into view of the driver just prior to the time the patrol car draws alongside the car being stopped so that the patrol officers are at the rear of the driver when he is advised of the fact that he is a subject of investigation.

In accomplishing this and other objects of the invention, I have provided improved details of structure, the preferred form of which is illustrated in the accompanying drawings, wherein:

Fig. 1 is a perspective view of the front portion of patrol car equipped with a signal constructed in accordance with my invention.

Fig. 2 is a plan view of the front portion of the car showing the signal in non-functional position.

Fig. 3 is a plan view of a patrol car drawing alongside a car to be stopped and showing the signal in functional position for advising the driver of the car that he is stopped by the peace officers.

Fig. 4 is a perspective view of the signal in non-functional position.

Fig. 5 is a detail perspective view of the operating parts of the signal shown in disassembled spaced relation.

Fig. 6 is a vertical sectional view through the signal.

Fig. 7 is a horizontal sectional view through the switch housing illustrating the switch for energizing the signal lamp.

Referring more in detail to the drawings:

1 designates a patrol car having a conventional type front fender 2 and an instrument board 3 located in front of the driver's seat.

Preferably mounted on the fender 2 directly above the right front wheel 4 is a signal lamp 5 constructed in accordance with the present invention.

The signal lamp includes a fixed supporting bracket member 6 having a base flange 7 that is provided with openings through which fastening devices 8 are extended to secure the supporting member to the fender as best illustrated in Figs. 1 and 6.

The supporting member includes a cylindrical upwardly extending neck portion 9, preferably formed integrally with the base flange 7 and carries a rack housing 10. The rack housing is supported by the base in a horizontal plane and includes a longitudinally extending rack guide portion 11 formed substantially tangentially with a flange 12 that is formed integrally with the neck portion 9.

The neck portion 9 is provided with an axially extending threaded socket 13 and formed in the upper face of the flange 12 in alignment with the socket 13 is a circular recess 14 forming the lower portion of a gear segment housing 15.

The rack guide portion 11 is provided with a longitudinal rectangular shaped track or groove 16 intersecting with the circular recess 14 as at 17 and having a stop wall 18 for limiting the movement of a rack bar 19. The rack bar 19 conforms in shape to the groove 16 and carries teeth 20 meshing with the teeth 21 on a gear segment 22 that is carried in the housing 15 so that the gear segment is rotated therein upon reciprocation of the rack bar.

The rack bar 19 is retained in the guide groove 16 by a cover plate 23 conforming in shape to the guide portion 11 and having a laterally extending cover portion 24 overlying the cylindrical flange 12 and which is provided with a circular opening 25 cooperating with the recess 14 to complete the walls of the gear housing 15.

The gear segment 22 is preferably formed integrally on the rotatable portion 26 of the lamp bracket. The base portion 26 is provided with an axial bore 27 having a counter bore 28 in its upper face to form an annular stop shoulder portion 29.

Extending through the bore 27 is a pintle 30 having a head 31 seating in the counter bore 28 to bear against the shoulder 29 and having a shank 32 carrying threads 33 that engage the threaded socket 13 in the fixed supporting member 6 to retain the base of the lamp bracket on the support.

Fixed to the upper face of the base portion 26 is a cover member 34 including a flange portion 35 which is anchored to the member 26 by bolts 36 extending through openings 37 in the flange and into threaded sockets 38 in the base portion 26.

Formed on the upper end of the cover member is a head portion 39 having a horizontal aperture 40 for receiving a pivot bolt 41 extending through ears 42 and 43 on housing 44 of the lamp. The ears 42 and 43 are retained in clamping relation against the sides of the head 39 by a nut 45 on the threaded shank 46 of the bolt.

The lamp housing includes a substantially semi-ellipsoidal shaped shell 47 having a reflecting inner surface 48 for directing the light rays from a bulb 49 that is supported in a socket 50 carried in the lamp housing.

The open front of the lamp housing is enclosed by a light diffusing panel 51 preferably formed of translucent glass for diffusing and dispersing the light over a juxtaposed transparent panel 52 carrying a stop indicia 53 including, for example, the words "Stop Police Car".

The panels 51 and 52 are retained in covering relation with the open side of the housing by a split band 54 shaped to the peripheries of the housing and having apertured ears 55 and 56 through which a bolt 57 is extended to contract the band.

In order to prevent moisture from leaking into the gear housing, the cover plate 23 is provided with an upwardly extending annular rib 58 that is received in an annular recess 59 formed in the bottom face of the base portion of the lamp bracket as clearly illustrated in Fig. 6.

The wire 60 carrying a suitable electric current to the socket 50 extends through an opening 61 in the support 6, through an opening 62 and a channel 63 in the pintle, and through an aligning channel in the gear cover plate. The wire then passes through an opening 64 in the head portion of the bracket in a loose loop 65 and is connected to the light socket 50.

The opposite end of the wire 60 is connected to a switch contact brush 66 that is mounted on the head 67 of the rack bar, the brush being supported from the head of the bar on an insulating block 68.

When the rack is reciprocated to rotate the lamp, the contact brush 66 is adapted to engage a fixed contact member 69 that is supported on the side of a lug 70 formed on the end of an extension 71 of the rack guide 11, the contact 69 being insulated from the lug by insulation block 72. The contact 69 in turn is connected by a wire 73 with a suitable source of current supply through the ammeter 74 in the same manner as the wires supplying current to the head lights of the vehicle, Fig. 5.

In order to actuate the rack bar from the driver's seat of the police car, I provide a flexible cable 75 having its end 76 extending through an opening 77 in the head of the rack bar and fixed therein by set screws 78. The cable 75 moves through a flexible sheathing 79 that has one end anchored in the lug 70 by set screws 80 and its opposite end anchored to the instrument board 3. The free end of the cable at the instrument board is provided with a suitable knob 81 whereby it can be readily grasped and reciprocated in the sheath.

The switch mechanism is covered by a housing 82 that is secured to the cover plate 23 by the screws 83 that secure the cover plate to the rack bar guide and a screw 84 which is threaded into a lug 85 extending from the side of the extension 71.

If desired, the wire 73 may also be housed within the flexible sheathing alongside the cable 75, as shown in the drawings.

In operating the signal constructed and assembled as described, the signal lamp is normally positioned so that the panel carrying the indicia faces the hood of the automobile, as illustrated in Fig. 2, and out of view of the vehicle traffic.

When the patrolmen wish to stop a car, they drive alongside the rear of the vehicle until the signal on the front fender is in advance of the driver, whereupon the police officer pulls on the knob 81 to effect rotation of the stop signal until the light is in view of the driver of the car to be stopped.

Upon movement of the flexible cable, the rack bar is actuated to rotate the gear segment which causes the lamp to swing into functional position on the pintle. Simultaneously with movement of the lamp, the brush contact 66 engages the fixed contact 69 energizing the circuit for illuminating and emphasizing the stop indicia on the transparent panel 52.

When the signal is actuated, the relative positions of the cars are such that the officers are back of the driver of the stopped car, so that the officers will have the advantage of the occupants of the stopped vehicle.

The occupants of the stopped vehicle will be readily warned by the stop light that officers desire them to stop and they will not continue on their way.

It is, therefore, apparent that the signal is not only a protection of the officers, but provides a protective warning to the driver of the stopped vehicle.

To return the signal to non-functional position, the cable is moved in the opposite direction causing the rack to rotate the gear segment reversely and breaking circuit to the lamp bulb.

What I claim and desire to secure by Letters Patent is:

1. In a device of the character described, a signal, a bracket adapted to be mounted on a vehicle, a rack bar guide connected with the bracket, a rack bar reciprocable in the guide, a gear member meshing with the rack bar, a base member connected with the gear member, a pintle anchored to the bracket and extending through the base and gear members and having a head portion engaging the base member to retain the base member on the bracket, means connecting the signal with the base member, a flexible operating member connected with the rack bar for reciprocating the rack bar to actuate the signal, and means carried by the bracket for slidably mounting the flexible operating member.

2. In a device of the character described, a signal, a bracket adapted to be mounted on a vehicle, a rack bar guide connected with the bracket, a rack bar reciprocable in the guide, a gear member meshing with the rack bar, a cover plate cooperating with the bracket for enclosing the gear member and rack bar, a base member connected with the gear member, a pintle anchored to the bracket and extending through the base and gear members and having a head portion engaging the base member to retain the base member on the bracket, means connecting the signal with the base member, a flexible operating member connected with the rack bar for reciprocating the rack bar to oscillate the signal, and a guide member carried by the bracket for slidably mounting the flexible operating member.

3. In a device of the character described, a signal, a bracket adapted to be mounted on a vehicle, a rack bar guide connected with the bracket, a rack bar reciprocable in the guide, a gear member meshing with the rack bar, a cover plate for the bracket having an opening rotatably mounting the gear member and an annular rib encircling the opening, a base member connected with the gear member and having an annular recess to accommodate said rib, a pintle anchored to the bracket and extending through the base and gear members and having a head portion engaging the base member to retain the base member, means connecting the signal with the base member, a flexible operating member connected with the rack bar for reciprocating the rack bar to effect oscillation of the signal, and a guide member carried on the bracket for slidably mounting the flexible operating member.

NEWTON S. HILLYARD.